Figure 8:
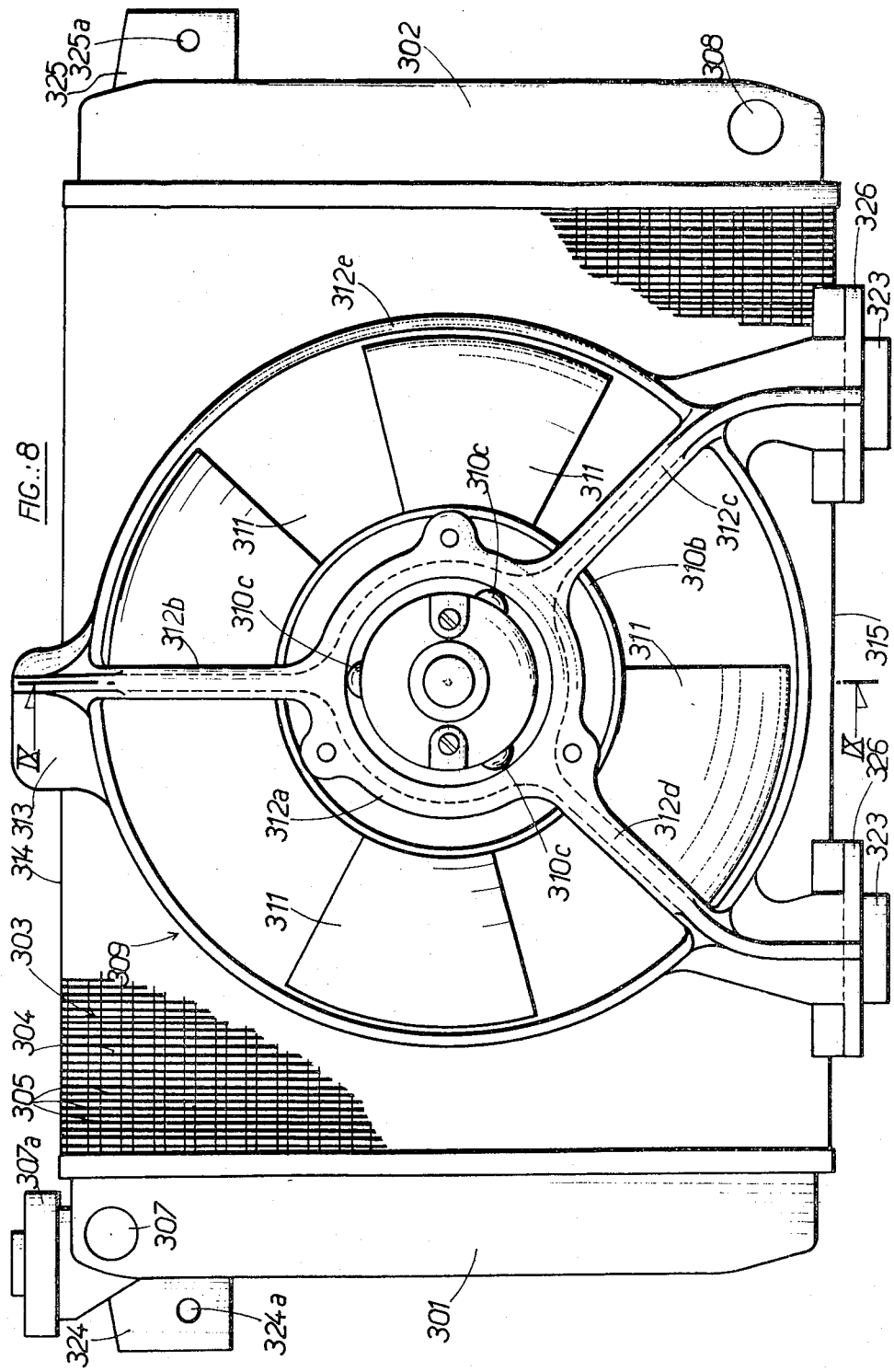

United States Patent [19]
Fieni

[11] 3,795,274
[45] Mar. 5, 1974

[54] FIXING OF HEAT-EXCHANGERS, INTER ALIA MOTOR VEHICLE RADIATORS

[75] Inventor: Walter Fieni, Paris, France

[73] Assignee: Societe Anonyme Francaise Du Ferodo, Paris, France

[22] Filed: July 12, 1972

[21] Appl. No.: 270,996

[30] Foreign Application Priority Data
July 12, 1971 France .............................. 71.25459
June 23, 1972 France.............................. 72.22812

[52] U.S. Cl................. 165/122, 165/67, 417/423 R
[51] Int. Cl................................................. F24h 3/06
[58] Field of Search....................... 165/67, 122–126; 417/423 R

[56] References Cited
UNITED STATES PATENTS
| | | | |
|---|---|---|---|
| 2,029,153 | 1/1936 | Burner............................ | 417/423 R |
| 2,168,549 | 8/1939 | Young............................ | 165/151 X |
| 2,932,489 | 4/1960 | Young............................ | 165/151 X |
| 1,856,924 | 3/1932 | Modine................................ | 165/67 |

Primary Examiner—Manuel A. Antonakas
Assistant Examiner—Theophil W. Streule, Jr.
Attorney, Agent, or Firm—Alfred W. Breiner

[57] ABSTRACT

A heat exchanger, particularly a radiator for a motor vehicle, of the type comprising a plurality of fluid conduits and a plurality of spaced, parallel, plate-like fins extending transversely to the fluid conduits and attached thereto is provided with at least one mounting member, serving either to mount the heat exchanger on a supporting structure or to mount an accessory (such as a motor and fan unit) on the heat exchanger, or serving both those purposes, which mounting member extends adjacent the juxtaposed and edges of a plurality of the fins and has portions engaging each of the opposite side edges of the fins, so as to clamp the fins between them, at least one of the said portions of the mounting member including a claw which is engaged in aligned notches formed in the corresponding side edges of at least some of the fins.

10 Claims, 9 Drawing Figures

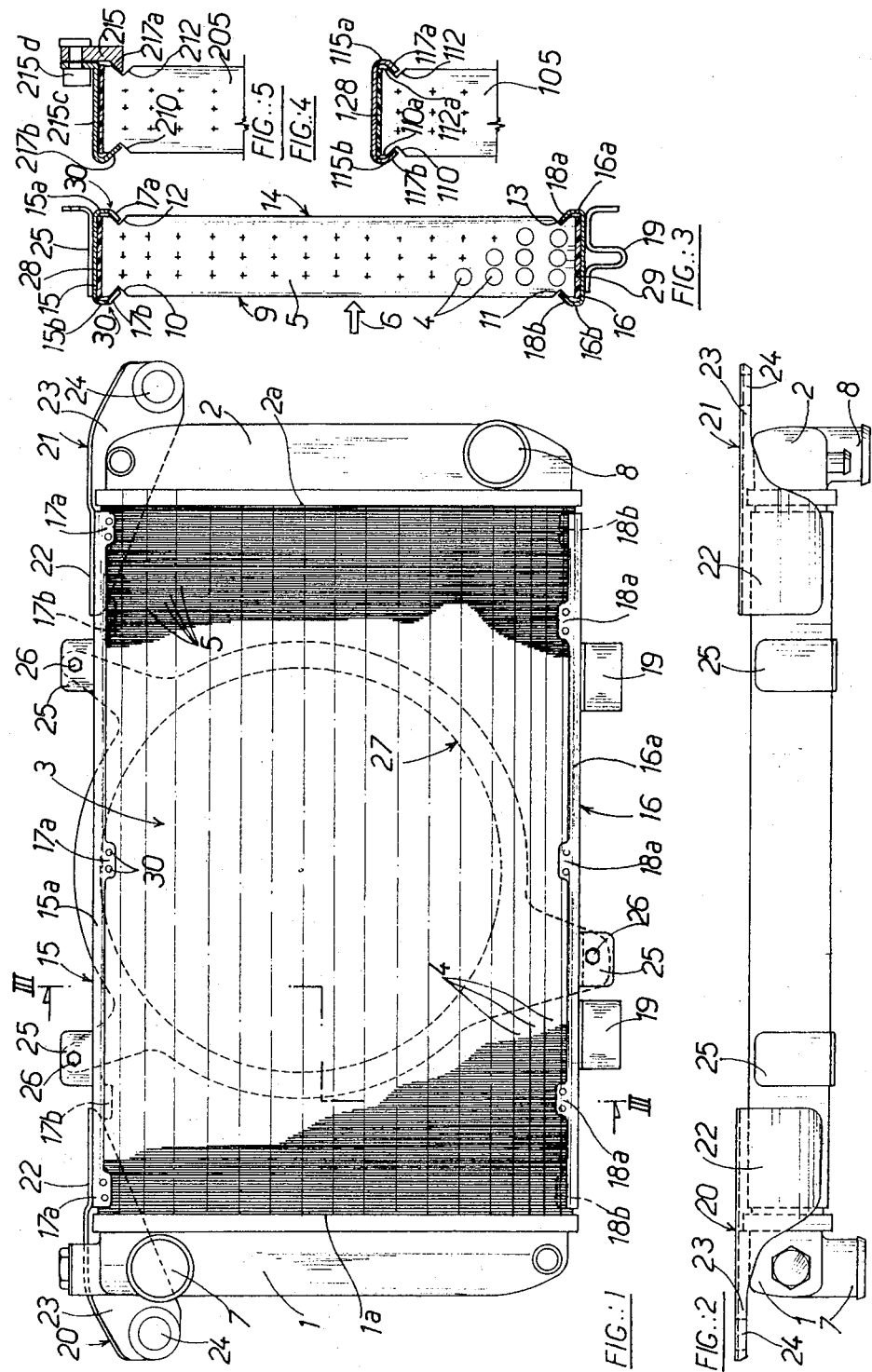

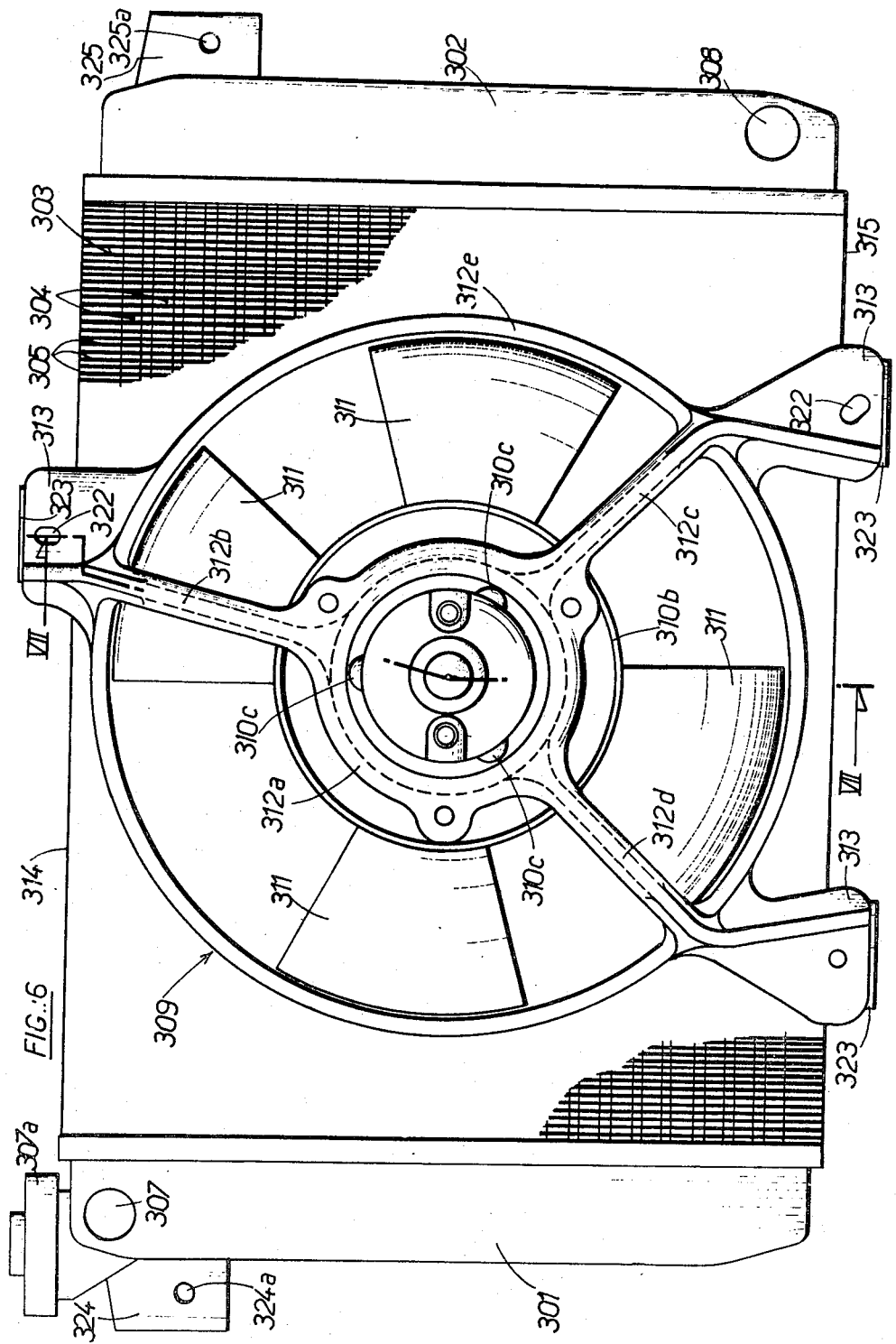

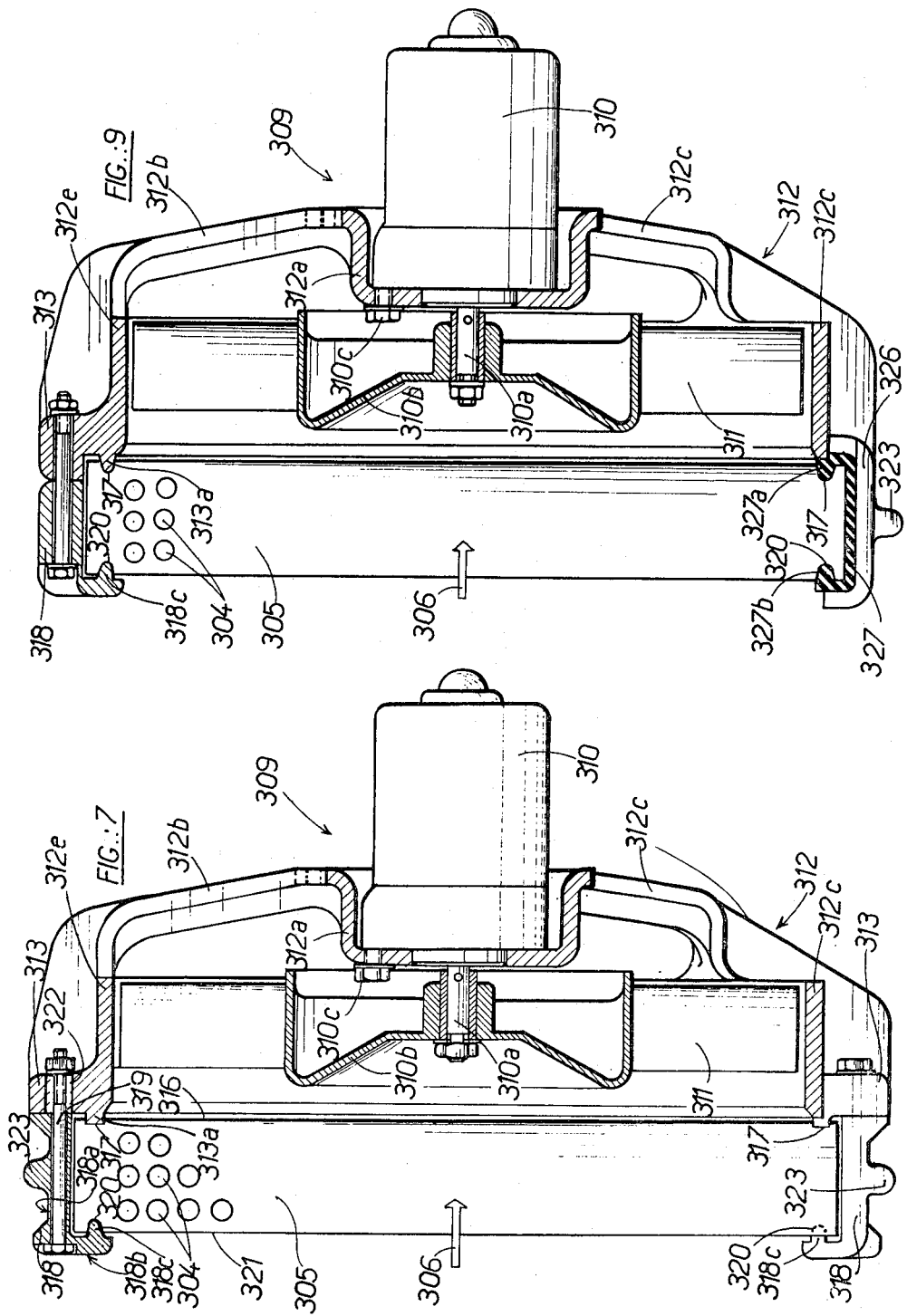

FIXING OF HEAT-EXCHANGERS, INTER ALIA MOTOR VEHICLE RADIATORS

The invention relates to heat exchangers of the kind comprising a plurality of fluid conduits and a plurality of spaced, parallel, plate-like fins extending transversely to the fluid conduits and attached to them. Heat exchangers of this kind are used inter alia as radiators for cooling the engines of motor vehicles. The invention provides improved mounting means for such a heat exchanger, these means serving either to mount the heat exchanger on a supporting structure, or to mount an accessory on the heat exchanger, or serving both these purposes.

In the conventional assembly technique, motor vehicle radiators are supported by the water tanks to which the ends of the fluid conduits are secured. A disadvantage of this assembly technique is that the joints between the tubes and the water tanks are subjected to heavy stressing.

The invention obviates this disadvantage by enabling the radiator to be supported by its fins, not its water tanks.

In accordance with a principal feature of the invention, a heat exchanger of the kind first defined above is provided with at least one mounting member extending adjacent the juxtaposed end edges of a plurality of said fins, said mounting member having portions engaging each of the opposite side edges of said fins and clamping said fins between them, at least one of said portions of said mounting member including a claw engaged in aligned notches formed in the corresponding side edges of at least some of said fins.

Further features of the invention will sufficiently appear from the following description of particular embodiments of the invention and from the appended claims when read in the light of that description.

The accompanying drawings show by way of illustrative examples a number of specific embodiments of the invention. In these drawings:

FIG. 1 is a front elevation of a radiator;
FIG. 2 is a plan view of the radiator of FIG. 1;
FIG. 3 is a sectional view, taken along the line III—III in FIG. 1;
FIGS. 4 and 5 are views corresponding to a part of FIG. 3, showing two alternative modifications;
FIG. 6 is a rear elevation of a radiator to which a motor and fan unit is fixed;
FIG. 7 is a sectional view, taken along the line VII—VII of FIG. 6;
FIG. 8 is a view analogous to FIG. 6, showing a modified construction; and
FIG. 9 is a sectional view, taken along the line IX—IX in FIG. 8.

The radiator illustrated in FIGS. 1 to 3 comprises in known manner two vertically elongated water tanks 1, 2 connected together by a finned tube assembly 3, which comprises a plurality of parallel, horizontally disposed tubes 4, extending perpendicularly through a series of rectangular metal plates 5 forming the radiator fins. The radiator is intended to be so mounted on a motor vehicle that a current of air (represented diagrammatically by an arrow 6 in FIG. 3) will flow through the radiator, the air passing between the fins 5 to cool the water, which enters the water tank 1 through an inlet 7, flows through the tubes 4 to the tank 2, and leaves the latter through an outlet 8. of facing length 12, The front edge 9 of each fin 5 is formed with two notches 10,11 disposed adjacent its top and bottom ends respectively. The rear edge 14 of each fin is formed with two other notches 12, 13 facing the notches 10,11 respectively. The top and bottom edges of the fins 5 are capped respectively by two cross-members 15 and 16, which extend between the opposed faces 1a, 2a of the water boxes 1, 2 parallel with the tubes 4 but are a little shorter than them, so that they do not contact the faces 1a, 2a. Each of the cross-members comprises a strip of sheet metal whose edges are turned down at right angles to form flanges 15a, 15b or 16a, 16b thus providing a channel-section which accurately caps the fins 5. Each of the flanges has at intervals along its length claws 17a, 17b; 18a, 18b which are bent to engage in notches 10, 12, 11, 13 formed in a plurality of the fins 5, thereby clamping the upper portion of such fins against the opposite flange 15b, 15a, 16b, 16a.

Attached by any suitable means, for instance, welding, beneath the bottom cross-member 16 are two pads 19 each formed by a shaped length of sheet metal strip and adapted to rest on rubber blocks (not shown) provided for this purpose in the vehicle for which the radiator is intended. Attached at each end of the top cross-member 15 are two sheet metal brackets 20, 21 each comprising a horizontal flange 22 which is welded or bolted to the web of the cross-member, and a vertical flange 23 which extends beyond the water tank 1 or 2 and is formed with an aperture 24 adapted to receive a bolt for fixing the radiator to a suitable part of the vehicle (not shown). Also attached to the cross-members (one beneath the cross-member 16 and two on the cross-member 15) are three fixing lugs 25 for receiving the fixing bolts 26 of a motor and fan unit, whose position is indicated at 27.

The cross-members 15, 16 constitute mounting members which securely support the radiator by clamping a plurality of its constituent fins. Advantageously, strips of elastomer material 28, 29 are trapped between the top cross-member 15 and the fins 5, and between the fins 5 and the bottom cross-member 16, to take up any clearance and ensure resilient clamping.

In the construction shown in FIGS. 1 to 3, the claws 17b are spaced longitudinally apart and are staggered, or offset longitudinally, relative to the claws 17a and the claws 18b are similarly staggered relative to the claws 18a. This arrangement reduces the amount of material required for the cross-members, but clearly the claws could be disposed opposite one another, as shown by way of example in FIG. 4. As shown in FIG. 4, claws 117a, 117b are disposed opposite one another; they may be arranged in spaced pairs, or they may extend over the whole length of the flanges 115a, 115b of the top cross-member 115. An elastomer strip 128 can be interposed between the cross-member 115 and the fins 105. When the claws 117a, 117b are bent into the notches 110, 112, the claws clamp between them the portions 110a, 112a of the fins disposed above the notches 110, 112.

To facilitate bending, the claws 17a, 17b; 18a, 18b in FIGS. 2 and 3 are each drilled with a line of holes 30 parallel with their free edges in the zone in which they are to be bent. Similar holes are preferably provided in the claws 117a, 117b shown in FIG. 4.

Clearly, the constructions described could be modified in many ways. For example, the mounting members are not necessarily constituted by cross-members extending along substantially the whole length of the radiator. Each mounting member might be fixed to only a few of the fins 5 by claws engaging in notches therein. This applies both to mounting members adapted for attachment to a supporting structure (such as a vehicle) and serving to mount the heat exchanger on that structure and to mounting members serving to mount a fan or other accessory on the heat exchanger.

Instead of engaging the claws in the notches by bending the material of which the claws are made, other clamping means may be used. In the embodiment shown in FIG. 5 the mounting member comprises two separable parts 215 and 215c. Part 215 has a projection 217a extending into the notches 212 in a number of fins 205. Part 215c extends over the end edges of the fins and has a projection 217b engaging in the notches 210 opposite the notches 212. Parts 215 and 214c are interconnected by a bolt 215d, so that the appendages 217a, 217b can be drawn towards one another to clamp the fins 205 between them after the fashion of claws.

In a variant which is not illustrated the pads 19 are borne by the accessory 27 and not directly by the bottom cross-member.

The radiator illustrated in FIGS. 6 and 7 comprises water tanks 301, 302 disposed vertically and connected by a finned tube assembly 303 comprising horizontal tubes 304 extending perpendicularly through a series of rectangular fins 305. The current of air flowing through the radiator is indicated by arrow 306, FIGS. 6 and 7 also showing inlet aperture 307 of water tank 301 and outlet aperture 308 of water tank 302; the plug 307a of the radiator is also shown.

The radiator is adapted to be mounted at the front of a motor vehicle, and the current of air 306 is sucked through the nest by a motor and fan unit 309 attached to the fins 305 by lugs, as will be explained hereinafter. Three lugs are provided, one of the lugs being fixed to the top face of the nest and the other two to its bottom face.

The motor and fan unit 309 comprises a motor 310 whose shaft 310a drives a hub 310b having blades 311 and attached by screws 310c to hub 312a of a frame 312. The hub 312a is connected via three arms 312b–321d to a casing 312e forming a circular cage in which the blades 311 rotate. The three arms are directed radially and each of them forms a lug 313 outside the casing. The angular disposition of the arms is such that when the lug 313 of one of the arms 312b is positioned opposite the top peripheral face 314 of the finned tube assembly, the lugs 313 of the two other arms 312c, 312d are positioned to engage the bottom peripheral face 315.

The front face of each of the lugs 313 has a rib 313a which, in the afore-mentioned position of the frame 312, extends horizontally across the rear edges 316 of the fins 305, so as to engage in notches 317 in the rear edges of such fins. The rib 313a of each lug 313 is kept clamped in the notch 317 by a member 318 fixed by a bolt 319 to the lug 313 so as to form therewith a U-section mounting member embracing the peripheral face 314 or 315. To this end the added member 318 comprises a horizontal portion 318a which extends across the peripheral face 314 or 315 and a vertical portion 318b; the latter has a rib 318c engaging in notches 320 in the front edges 321 of the fins, opposite the notches 317. The horizontal portion 318a has a length such that the fins are firmly clamped between the claws formed by the ribs 313a and 318c when the member 318 is drawn against the lug 313 by the bolt 319. In two of the lugs 313 the holes 322 for the bolts 319 are made oval to allow a certain amount of adjustment.

Each of the members 318 in the lower part of the radiator (i.e. the members bolted to the lugs 313 of the arms 312c and 312d) has on its outer face an appendage 323 forming a pad; the two pads 323 are adapted to rest on rubber blocks provided to this end in the vehicle when the radiator is fixed to the latter by bolts (not shown) extending through holes 324a, 325a connected to the water tanks 301 and 302 respectively. In the construction illustrated, the member 318 which is bolted to the lug 313 of the top arm 312b, also has an appendage 323, so that only one kind of member 318 need be provided.

To mount the radiator on a vehicle, the motor and fan unit 309 is first fixed to the radiator as described above and the assembly thus formed is then fixed to the vehicle by the lugs 324, 325, making the bottom pads 323 rest on the rubber blocks of the vehicle. Clearly, it would be possible to substitute for the lugs connected to the water tanks, mounting members clamped to the fins in any of the ways described above.

FIGS. 8 and 9 (in which like elements to those illustrated in FIGS. 6 and 7 are given like references) illustrate an embodiment which differs from the construction last described only by the feature that each of the bottom arms 312c, 312d forms outside the casing 312e, not a lug 313 having a rib or claw 313a clamped in notches in the fins by a cooperating member, but a U-section cradle 326 has no ribs or claws and merely embraces the bottom peripheral face 315 of the nest. Notches 317, 320 are again provided in the lower ends of the fins, but they serve only to receive strips 327a, 327b of a section of resilient material 327 interposed between the fins and the cradles 326. The appendages 323 forming the pads are unitary with the cradles 326, and the assembly formed by the radiator and the motor and fan unit is mounted on the vehicle in the manner described with reference to FIGS. 6 and 7.

The lug 313 of the top arm 312b and its added member 318 have a general shape similar to that shown in FIGS. 6 and 7, but in this case the added member has no appendage 323.

In a variant which is not illustrated the heat exchanger is fixed to its support (for instance, the radiator is fixed to the vehicle) via the accessory.

I claim:

1. A heat exchanger comprising a plurality of fluid conduits extending between two headers, and a set of spaced parallel plate-like fins extending transversely to said fluid conduits and attached thereto to form a heat-exchanger core having a pair of opposite laminated peripheral faces formed by the respective end edges of the fins disposed adjacent one another, and a pair of opposite laminated athwart faces formed by the respective side edges of the fins disposed adjacent one another; and at least one mounting member extending along at least a region of one of said peripheral faces and having first and second flanges engaging respective regions of said athwart faces, said first flange including at least one claw engaged in aligned notches formed in the corresponding side edges of a plurality of said fins, and force fitted in said aligned notches towards said second flanges to grip therebetween that portion of the fins which is straddled by said claw and said second flange, whereby to hold the heat-exchanger core ridigly fast to the supporting member through said plurality of fins.

2. A heat exchanger as claimed in claim 1, wherein said claw comprises an edge portion of the first flange which is bent and pressed into said aligned notches.

3. A heat exchanger as claimed in claim 1, wherein said claw comprises an insert having a projection adapted to fit in said aligned notches, comprising screw means for drawing said insert towards the second flange to clamp said projection into said aligned notches.

4. A heat exchanger as claimed in claim 1, wherein the second flange includes at least one like claw engaged in aligned notches formed in the corresponding side edges of a plurality of fins, and force fitted towards the first flange.

5. A heat exchanger as claimed in claim 4, wherein the first flange comprises a plurality of spaced claws, and the second flange comprises a plurality of spaced claws offset longitudinally relative to the claws of the first flange.

6. A heat exchanger as claimed in claim 1, comprising means for fastening said mounting member to a support structure whereby to mount said heat-exchanger core on said structure.

7. A heat exchanger as claimed in claim 1, comprising means for fastening an accessory to the mounting member whereby to mount the accessory to the heat-exchanger core.

8. A heat exchanger as claimed in claim 3 in combination with an accessory, said second flange constituting part of said accessory, whereby operation of said screw means serves to secure said accessory to said heat exchanger.

9. The combination set forth in claim 8 further including means fast to said accessroy and embracing those end portions of a plurality of said fins that lie opposite to the end portions engaged by said mounting member.

10. The combination set forth in claim 8 wherein said accessory is a motor and fan unit comprising a hub to which the motor is secured, blades secured to the motor shaft, a circular casing encircling said blades, arms connecting said hub to said casing and lugs projecting from said casing and engaging said heat exchanger to secure said motor and fan unit thereto.

* * * * *